Oct. 23, 1928.

W. S. GRANT

CONTAINER

Filed Oct. 20, 1926

INVENTOR:
WALTER S. GRANT

By James L. Hopkins,
ATTORNEY

Patented Oct. 23, 1928.

1,688,703

UNITED STATES PATENT OFFICE.

WALTER S. GRANT, OF ST. LOUIS, MISSOURI.

CONTAINER.

Application filed October 20, 1926. Serial No. 142,797.

My invention relates to containers and has for its object to provide a shipping and dispensing can for liquids, so constructed as to have a flat bottom, and a curved and approximately cylindrical wall upon which the container rests during the operation of pouring.

The container of my invention may also embody a weight containing a hand-hold and mounted in contiguity with said flat bottom, serving as a steadying means when the can is in upright position and as a counterbalance to return the container to its seat after the operation of pouring, and as a handle during the act of pouring.

My container includes a carrying handle, and a pouring spout so located in the circular wall of the container as to be protected from accidental injury by the circular wall and the handle.

My container may also embody a valved air-vent mounted in the circular wall in such proximity to the carrying handle as to be protected by said handle against accidental injury, the mouth of said vent having a closure for use in transportation of the container.

Other advantages incident to my invention will be apparent from the appended description.

Drawings.

In the drawings—

Figure 1:
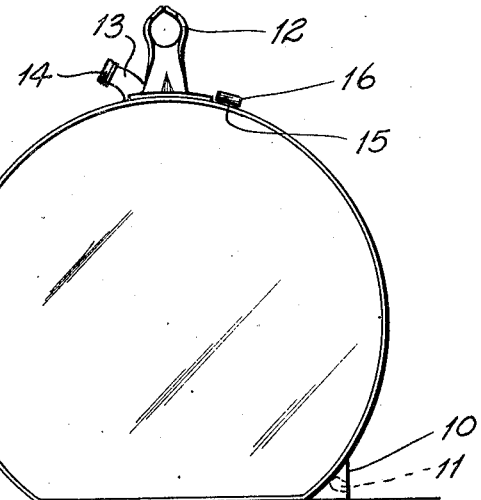
Fig. 1 is a side elevation of a container embodying my invention.
Figure 2:
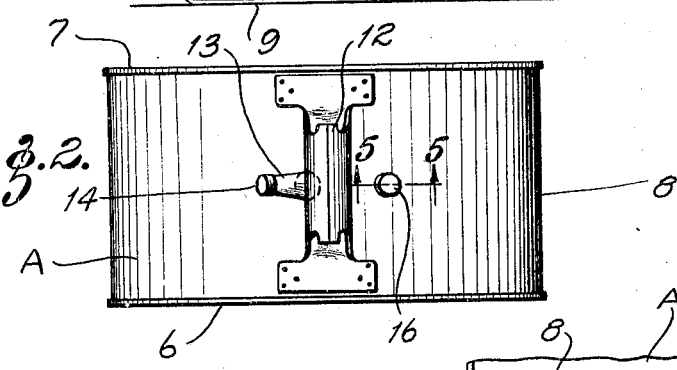
Fig. 2 is a top plan view of the same.
Figure 3:
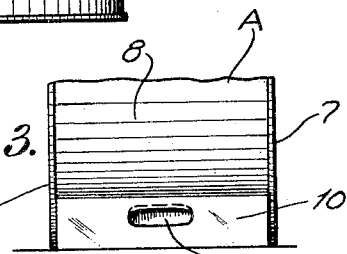
Fig. 3 is a rear elevation of the same.

Description.

The container A is drum-shaped in form and comprises the heads 6 and 7, the circular wall 8 and flat bottom 9, upon which the container A seats except during the operation of pouring. In juxtaposition to the bottom 9 is the weight 10, forming an extension of the bottom 9, containing a hand-hold 11.

Figure 4:
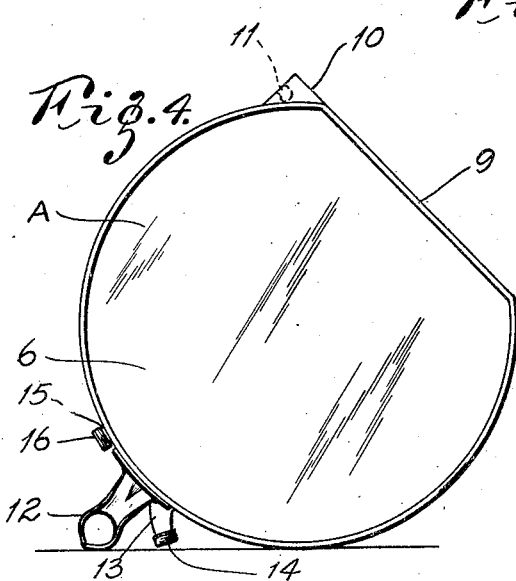
Fig. 4 is a side view of the same up-ended, illustrating the protection of the pouring spout by the carrying handle when the container is dropped upside-down.
Figure 5:
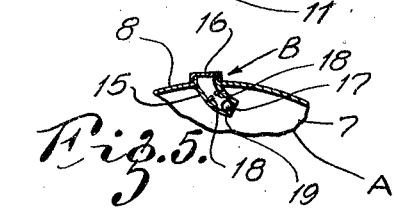
Fig. 5 is a fragmental view, in longitudinal section, of the valve-controlled vent, taken on the line 5—5 of Fig. 2.

The container A is surmounted by a suitable handle 12, and the pouring spout 13 (having a closure 14 for use in shipping) is so mounted with relation to the handle 12 as to be protected by said handle 12 when the container A is accidentally dropped upside-down as shown in Fig. 4.

Also in proximity to the carrying handle 12 I provide a vent B comprising a tapering tube 15 having an outer closure 16 (for use in shipping), a restricted inner mouth 17, stops 18, and valve-ball 19; the ball 19 having a play between the restricted mouth 17 and the stops 18. This vent construction enables the contents of the container A to be steadily poured from the spout 13 without gurgling.

Variations of the structure of the container illustrated and described herein may be made without departure from my actual invention as defined in the appended claims.

By the expression "upside-down" as used in this specification is meant the inverted position illustrated in Fig. 4.

I claim:

1. A container consisting of a substantially drum-shaped body; a carrying handle mounted at the top of said body; and a pouring spout so mounted in relation to said handle as to be protected by said handle from injury when the container is dropped upside-down, the tip of said pouring spout being within the plane wherewith said handle and the outer wall of said drum-shaped body contact when the container is in upside-down position.

2. A container consisting of a substantially drum-shaped body; a carrying handle mounted at the top of said body; a valve-controlled vent; and a pouring spout so mounted in relation to said handle as to be protected by said handle from injury when the container is dropped upside-down, the tip of said pouring spout being within the plane wherewith said handle and the outer wall of said drum-shaped body contact when the container is in upside-down position.

3. A container comprising in combination a substantially drum-shaped body arranged to be tilted upon its circular wall; a flat-bottom formed in said wall; and a weight mounted in juxtaposition to said flattened bottom and forming an extension of said body in the same plane as that of said flattened bottom.

4. A container comprising in combination a substantially drum-shaped body arranged to be tilted upon its circular wall; a flat-bottom formed in said wall; and a weight mounted in juxtaposition to said flattened bottom and forming an extension of said body in the same plane as that of said flattened bottom, said weight being contoured to provide a hand-hold.

5. A container having a wall substantially circular in section; a handle mounted on said wall; a pouring spout mounted in said wall at one side of said handle; and a valve-controlled vent mounted in said wall at the opposite side of said handle, said vent comprising a tube having an outer closure and a valve-ball in combination with a flattened bottom formed in said wall.

In testimony whereof I have hereunto affixed my signature.

WALTER S. GRANT.